United States Patent [19]

Momose et al.

[11] 4,309,489
[45] Jan. 5, 1982

[54] FE-NI-CU-CR LAYERED BIMETAL

[75] Inventors: Kenichiro Momose, Ebina; Kiyoshi Kumagai, Yokohama; Fumio Mori, Yokohama, all of Japan

[73] Assignee: Tokyo Shibaura Denki Kabushiki Kaisha, Kanagawa, Japan

[21] Appl. No.: 149,725

[22] Filed: May 14, 1980

[30] Foreign Application Priority Data

May 14, 1979 [JP] Japan .................................. 54-58097
Jul. 13, 1979 [JP] Japan .................................. 54-88070

[51] Int. Cl.³ .......................... B32B 7/00; B32B 15/18
[52] U.S. Cl. .................................. 428/619; 75/134 C; 75/134 F; 428/682
[58] Field of Search ................. 75/134 C, 134 F, 125, 75/170, 171; 428/616–619, 678–685

[56] References Cited

U.S. PATENT DOCUMENTS

| | | | |
|---|---|---|---|
| 965,871 | 8/1910 | Clamer | 75/170 |
| 1,016,549 | 2/1912 | Clamer | 75/170 |
| 1,481,021 | 1/1924 | Marshall | 428/616 |
| 1,660,246 | 2/1928 | Wille | 75/134 C |
| 1,723,215 | 8/1929 | Smith et al. | 75/125 |
| 1,757,178 | 5/1930 | Elmen | 75/170 |
| 1,803,353 | 5/1931 | Porter | 75/170 E |
| 1,805,049 | 5/1931 | Pilling | 75/125 |
| 2,968,548 | 1/1961 | Clark | 75/125 |
| 4,131,494 | 12/1978 | Momose et al. | 148/31.57 |

OTHER PUBLICATIONS

Masumoto et al.; *Nihon Kinzoku Gakkai Shi* (J. of Jap. Inst. of Metals), vol. 19, pp. 478–480, (1955).

*Primary Examiner*—Michael L. Lewis
*Attorney, Agent, or Firm*—Schwartz, Jeffery, Schwaab, Mack, Blumenthal & Koch

[57] ABSTRACT

There are provided a low expansion alloy having a high corrosion resistance which consists essentially of 25–50% by weight of Ni, 1–25% by weight of Cu and optionally up to 20% by weight of Cr and the balance of essentially Fe with a small amount of impurities, and a corrosion resistant bimetal formed by applying together a low expansion alloy plate which consists essentially of 25–50% by weight of Ni, 1–25% by weight of Cu and optionally up to 20% by weight of Cr and the balance of essentially Fe, and a corrosion resistant alloy plate which has a linear expansion coefficient larger than that of said low expansion alloy plate by $5 \times 10^{-6}$° C.

3 Claims, No Drawings

FE-NI-CU-CR LAYERED BIMETAL

BACKGROUND OF THE INVENTION

This invention relates to a low expansion alloy and a bimetal using said alloy and, more particularly, to a low expansion alloy which is formed by adding Cu, or Cu and Cr to a Ni-Fe type alloy, and to a bimetal made from such an alloy.

36Ni-Fe type alloy known as Invar has long been known in the art as an alloy suitable for use in precision gauges, metric standard gauges, compensation pendulums for clocks, and the low expansion portion of a bimetal. There is also known 32Ni-5CR-Fe type Super Invar which includes Co and which is an improved form of the Invar. These alloys are characterized by their small coefficient of linear expansion: Invar and Super Invar show the linear expansion coefficients of about $1 \times 10^{-6}/°C$. and $1 \times 10^{-7}/°C$. respectively in the temperature range of 0° to 40° C. The above coefficients are respectively about 1/10 and 1/100 of the linear expansion coefficients of Iron and Nickel. These properties are considered to have been achieved by the combined action of thermal expansion and magnetic volume shrinkage.

However, the above mentioned materials have drawbacks such as unsatisfactory corrosion resistance due to insufficient Ni content, and rusts tended to appear in practical use. Therefore, the above alloys used for a bimetal at the low expansion side thereof do not have satisfactory corrosion resistance under severe conditions, and where high corrosion resistance is required, they have often been found inferior to Cr-Fe type alloys such as 18-Cr Stainless Steel. The linear expansion coefficient can be reduced and corrosion resistance simultaneously improved by increasing the Cr content. But since a higher Cr content excessively deteriorates workability, the alloy with the linear expansion coefficient of $10 \times 10^{-6}/°C$. has been heretofore considered the limit. An alloy by the name of Stainless Invar has also been used as a low expansion alloy where a corrosion resistant property was required; as it contains Co by almost 50%, it is extremely expensive.

Thus, there has been demand in the art for the development of a Ni-Fe type alloy which has a low expansion coefficient and high corrosion resistance and which is free of the above mentioned problems.

SUMMARY OF THE INVENTION

An object of the present invention is to provide a Ni-Fe type alloy which has a low expansion coefficient and has excellent corrosion resistance and which can be manufactured at low cost.

Another object of the present invention is to provide a bimetal which uses on its low expansion side an inexpensive Ni-Fe type alloy which has a low expansion coefficient and excellent corrosion resistance.

The low expansion alloy according to the present invention consists essentially of 25-50% by weight of Ni, 1-25% by weight of Cu, and optionally up to 20% by weight of Cr, and the balance being essentially Fe including a small amount of impurities.

DETAILED DESCRIPTION OF THE PREFERRED EMBODIMENTS

The low expansion alloy of the present invention, as described above, consists essentially of 25-50% by weight of Ni, 1-25% by weight of Cu and, optionally up to 20% by weight of Cr, and the balance being essentially Fe including a small amount of impurities. The alloy according to the present invention was developed taking note of the fact that addition of Cu to the Invar region of a Ni-Fe type alloy increases the saturated magnetic flux density as is the case of Co addition.

The percentage range of the alloy of the present invention is determined with considerations given to improving and maintaining low expansion and corrosion resistant properties. Ni outside of the above mentioned range makes the thermal expansion coefficient higher. Therefore, it is practical to keep the Ni content within a range of 28-40% and more preferably within that of 30-36%. Too small of an amount of Cu will not achieve the desired effect as an additive, but if too much is added, it often hampers workability.

The Cu content is preferably to be in the range of 1-20% by weight and more preferably of 2-16% by weight. Cr is added in order to improve corrosion resistance of the alloy whenever the necessity arises, but if added in too large of an amount, it raises the thermal expansion coefficient. Therefore, the preferable range of Cr content is normally set to be 1-20% by weight, more preferably 5-15% by weight, and most preferably 6-12% by weight. Accordingly, the preferred example of the alloy of the present invention consists of 28-40% by weight of Ni, 1-20% by weight of Cu and the balance of essentially Fe including a small amount of impurities, and more preferably it consists of 30-36% by weight of Ni, 2-16% by weight of Cu and the balance of essentially Fe including a small amount of impurities with a linear expansion coefficient of not more than $7 \times 10^{-6}/°C$.

When Cr is contained, the alloy of the present invention consists normally of 25-50% by weight of Ni, 1-25% by weight of Cu, 1-20% by weight of Cr and the balance of essentially Fe with a small amount of impurities, and preferably 28-40% by weight of Ni, 1-20% by weight of Cu, 5-15% by weight of Cr and the balance of essentially Fe with a small amount of impurities, and more preferably it consists of 30-36% by weight of Ni, 5-16% by weight of Cu, 6-12% by weight of Cr and the balance of essentially Fe with a small amount of impurities and with a linear expansion coefficient of not more than $10 \times 10^{-6}/°C$.

It is permissible to add small amounts of Mo, W, Mn, Si, Ti or Nb to the present invention alloy for the purposes of improving hot workability and other properties. Co added extensively would not impair the low expansion property too much.

In order to manufacture the alloy according to the present invention, ingredients mixed in a predetermined ratio are subjected to a high-frequency melting-process at a temperature, for instance, of 1500° C. either in a vacuum or in an ambient atmosphere to obtain an ingot. The ingot is subjected to hot working at about 1000° C., and to cutting to be formed into predetermined shapes. It is further subjected to hot working and cold working.

The alloy of the present invention is provided with a low expansion property and a corrosion resistance. The alloy of the present invention is quite useful as a material for a bimetal or a material for scales, and particularly useful as a material for parts used inside pipes because it will not become rusty during the manufacturing process even if used in a corrosive atmosphere. It is further useful as an alloy used in the thermostat in heating apparatus and the low expansion side of temperature regulators. It is further preferred as an alloy for lead frames or for Dumet wire cores.

The inventors of the present invention have succeeded in developing a bimetal which has excellent corrosion resistance and a large deflection coefficient by utilizing the above mentioned alloy. The bimetal according to the present invention comprises a low expansion side which consists of 25-50% by weight of Ni, 1-25% by weight of Cu, and optionally up to 20% by weight of Cr and the balance of essentially Fe with a small amount of impurities, and a corrosion resistant alloy plate having a linear expansion coefficient larger than that of the lower expansion side by $5 \times 10^{-6}/°C$. adhered to the corrosion resistant alloy to form a corrosion resistant bimetal.

The corrosion resistant bimetal according to the present invention is manufactured by affixing a low expansion alloy plate on a higher expansion alloy plate either by hot working or by cold working, and then by rolling.

The lower expansion side alloy preferably consists of 25-45% by weight of Ni, 2-20% by weight of Cu, not more than 2% by weight of unavoidable impurities and the balance of Fe and more preferably of 28-40% by weight of Ni, 5-16% by weight of Cu and balance of Fe, having a linear expansion coefficient of not more than $10 \times 10^{-6}/°C$. and preferably of not more than $5 \times 10^{-6}/°C$. If the Ni content is less than 25% by weight, the low expansion property is impaired while if it exceeds 45% by weight, the reduction of the thermal expansion coefficient by Cu addition almost disappears. In the case where the Cu content is less than 5%, improvement in corrosion resistance is not observed while at more than 16%, the workability thereof is deteriorated.

In order to further improve the corrosion resistance of the alloy, Cr can be contained in an amount of 3-20% by weight, or preferably 6-12% by weight. The alloy in this case has a linear expansion coefficient of not more than $10 \times 10^{-6}/°C$. Where the Cr content is less than 3% by weight, the corrosion resistance is not improved and where it exceeds 20% by weight, the workability is extremely deteriorated.

A higher expansion alloy side is applied upon the lower expansion alloy plate mentioned above. The higher expansion alloy side could be, for instance, 22Ni-4Cr-Fe, 18Cr-8Ni-Fe, 18Ni-12Cr-Fe or the like which has a linear expansion coefficient larger than that of the lower expansion side by $5 \times 10^{-6}/°C$. and preferably by $8 \times 10^{-6}/°C$. The reason why it should have a linear expansion coefficient larger than that of the lower expansion side by $5 \times 10^{-6}/°C$. or more is to increase the deflection coefficient which is important in determining bimetal performance. The desirable deflection coefficient is normally not less than 5, and preferably not less than 7.

Applying the lower expansion alloy side on the higher expansion alloy side is carried out, for instance, at 800°-1300° C. in the hot working, and at ambient temperature in the cold working, and then subjecting it to a rolling process to have a thickness of about 0.1-3 mm.

The bimetal thus obtained according to the present invention exhibits an excellent corrosion resistance and performances even if used under severe conditions, and can be manufactured at low cost.

The present invention is further described in detail referring to Examples and Comparative Examples shown below. However, the present invention is not to be limited to those Examples.

EXAMPLES 1-12, Comparative Example 1

The ingot obtained by melting the materials by the predetermined ratio shown in the table was cut out to obtain rods ($5\phi \times 80$ l) or rolled into plates ($2 \times 2 \times 80$ l) as samples. The sample was then subjected to heat treatment at about 1000° C. and the thermal expansion coefficient [$\alpha$] and corrosion resistance were studied. In order to investigate the corrosion resistance, a brine spray test was carried out by spraying 5% NaCl solution and the surface of the samples was observed after allowing the sample to stand at 35° C. for 4 hours after spraying. Result are shown in the table. For comparison purposes, the test result using Invar alloy is also shown.

TABLE 1

| | Composition (weight percent) | | | | $\alpha$ $10^{-6}/°C$. (30-100° C.) | Corrosion Resistance |
|---|---|---|---|---|---|---|
| | Ni | Cu | Cr | Fe | | |
| Examples | | | | | | |
| 1 | 26 | 8 | — | bal | 10.6 | slight rusting |
| 2 | 30 | 8 | — | bal | 5.0 | " |
| 3 | 32 | 8 | — | bal | 3.4 | " |
| 4 | 38 | 8 | — | bal | 6.5 | " |
| 5 | 41 | 8 | — | bal | 10.5 | " |
| 6 | 55 | 8 | — | bal | 12.0 | " |
| 7 | 32 | 4 | — | bal | 4.0 | " |
| 8 | 32 | 14 | — | bal | 5.2 | " |
| 9 | 32 | 4 | 10 | bal | 11.5 | no rusting |
| 10 | 32 | 8 | 10 | bal | 8.3 | " |
| 11 | 32 | 12 | 10 | bal | 4.8 | " |
| 12 | 32 | 16 | 10 | bal | 4.7 | " |
| Comparative Example | | | | | | |
| 1 | 36 | — | — | bal | 1.7 | considerable rusting |

As is clearly understood from Table 1, in the case of the present invention alloy where Cu is added to Ni-Fe alloy, the thermal expansion coefficient does not show a simple increase as in other cases where a large number of elements is added. It is observed that the above mentioned property is relevant to the fact that Cu addition brings about an increase of the saturated magnetic flux density in the Invar region when Ni content is kept constant.

The corrosion resistance of the alloy according to the present invention is remarkably improved compared with conventional Invar alloys. In other words, the present invention alloy combines low expansion properties and high corrosion resistance. Among the examples of the alloy of the present invention, Fe-Ni-Cu alloy (sample 3) which has sufficient corrosion resistance to be practically used in the ambient atmosphere gave a value of $\alpha: 3.4 \times 10^{-6}/°C.$, and the Fe-Ni-Cu-Cr alloy (sample 12) which has a superior corrosion resistance showed a value of $\alpha: 4.7 \times 10^{-6}/°C$.

The alloy according to the present invention further is advantageous in that it maintains a predetermined thermal expansion property even in the high temperature range, since Cu addition raises the Curie point.

EXAMPLES 13-19, Comparative Examples 2-4

Alloy plates consisting of various materials shown in Table 2 are applied together either in hot working or in cold working and rolled into 0.8 mm thick plates. The deflection coefficient of the thus obtained bimetal is measured and the corrosion resistant property is studied in the brine spray test. The result is shown in Table 2. The brine spray test was carried out by spraying 5% NaCl solution and by allowing the sample to stand at 35° C. for 5 hours after spraying.

TABLE 2

| | Low Expansion Side Alloy | | | | | High Expansion Side Alloy | | Properties of Bimetal | |
|---|---|---|---|---|---|---|---|---|---|
| | Composition (% by weight) | | | | Linear Expansion Coefficient | High Expansion Side Alloy | Linear Expansion Coefficient | Deflection Coefficient | Brine Spray |
| | Ni | Cu | Cr | Fe | ($\times 10^{-6}$/°C.) | Composition | ($\times 10^{-6}$/°C.) | ($\times 10^{-6}$/°C.) | Test |
| Examples | | | | | | | | | |
| 13 | 32 | 8 | — | bal | 3.4 | 18Ni—12Cr—Fe | 17.5 | 11.3 | slight rusting on low expansion side |
| 14 | 32 | 14 | — | bal | 5.0 | " | " | 10.0 | slight rusting on low expansion side |
| 15 | 38 | 8 | — | bal | 6.5 | " | " | 8.8 | slight rusting on low expansion side |
| 16 | 30 | 8 | — | bal | 4.7 | " | " | 10.2 | slight rusting on low expansion side |
| 17 | 32 | 8 | 10 | bal | 8.3 | " | " | 7.4 | hardly any rusting |
| 18 | 32 | 12 | 10 | bal | 4.8 | " | " | 10.2 | hardly any rusting |
| 19 | 34 | 7 | 11 | bal | 7.0 | " | " | 8.4 | hardly any rusting |
| Comparative Examples | | | | | | | | | |
| 2 | 36 | — | — | bal | 1.5 | " | " | 12.8 | rusting on low expansion side |
| 3 | — | — | 13 | bal | 10.6 | " | " | 5.5 | rusting on low expansion side |
| 4 | — | — | 18 | bal | 10.5 | " | " | 5.6 | hardly any rusting |

As is clear from the above results, the present invention bimetal has a corrosion resistance far exceeding that of the conventional bimetals, and also has a large deflection coefficient and presents high performance.

What is claimed is:

1. A corrosion resistant bimetal formed by applying together a low expansion alloy plate which consists essentially of 25-45% by weight of Ni, 2-20% by weight of Cu, 3-20% by weight of Cr and the balance of Fe, and a corrosion resistant alloy plate which has a linear expansion coefficient larger than that of said low expansion alloy plate by $5 \times 10^{-6}$/°C.

2. A bimetal as claimed in claim 1, wherein said low expansion alloy plate consists essentially of 28-40% by weight Ni, 2-20% by weight Cu, 5-15% by weight Cr, and the balance of Fe.

3. A bimetal as claimed in claim 1, wherein said low expansion alloy plate consists essentially of 30-36% by weight Ni, 5-16% by weight Cu, 6-12% by weight Cr, and the balance of Fe.

* * * * *